G. H. TABER.
AIR VALVE FOR CARBURETERS.
APPLICATION FILED NOV. 24, 1915.

1,254,084.

Patented Jan. 22, 1918.
2 SHEETS—SHEET 1.

Witness:
Titus H. Irms

Inventor
George H. Taber
By his Attorneys,
Kerr Page Cooper + Hayward

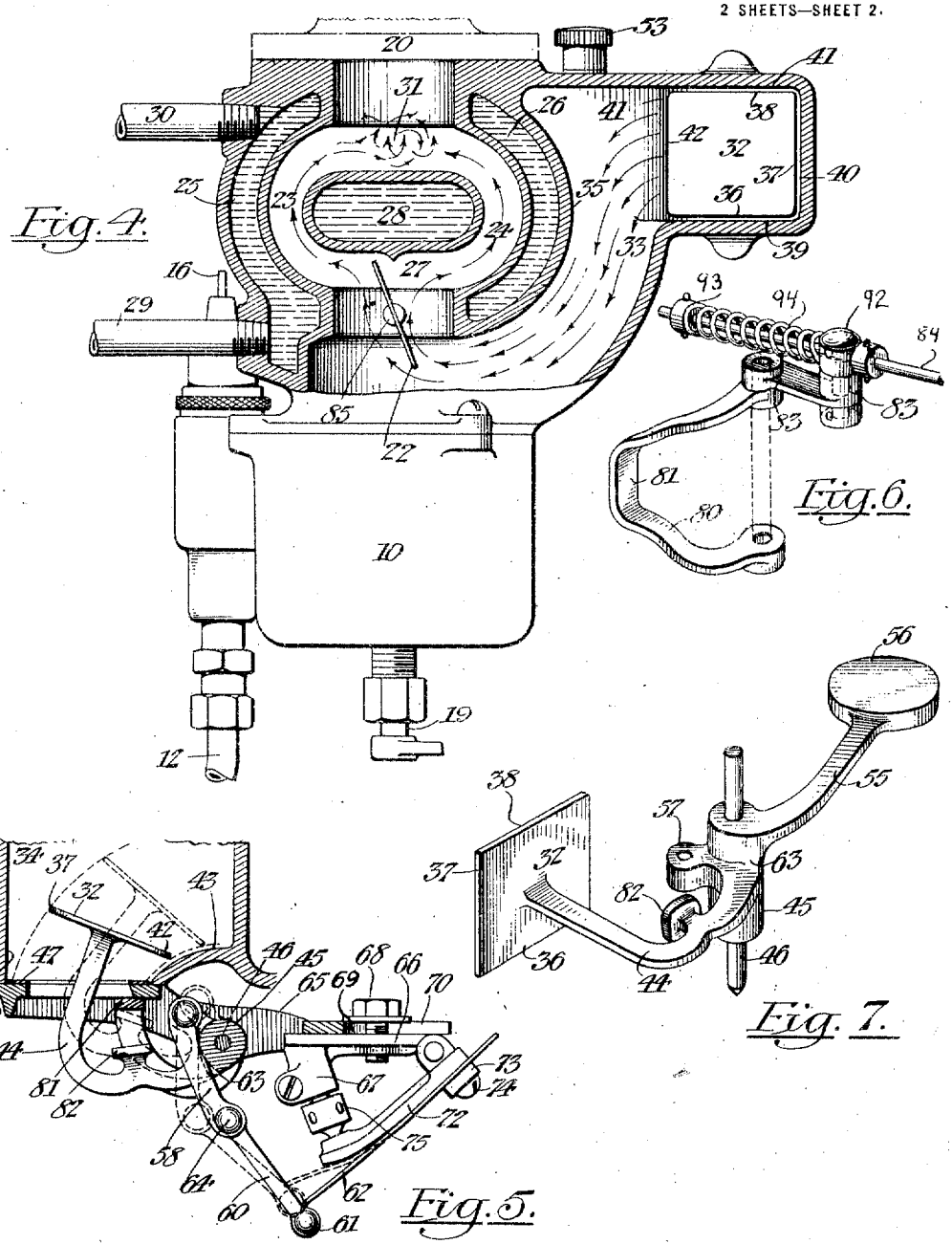

UNITED STATES PATENT OFFICE.

GEORGE H. TABER, OF BINGHAMTON, NEW YORK, ASSIGNOR TO THE TABER CARBURETER COMPANY INC., OF BINGHAMTON, NEW YORK, A CORPORATION OF NEW YORK.

AIR-VALVE FOR CARBURETERS.

1,254,084.  Specification of Letters Patent.  Patented Jan. 22, 1918.

Application filed November 24, 1915. Serial No. 63,183.

*To all whom it may concern:*

Be it known that I, GEORGE H. TABER, a citizen of the United States, residing at Binghamton, in the county of Broom and State of New York, have invented certain new and useful Improvements in Air-Valves for Carbureters, of which the following is a full, clear, and exact description.

This invention relates to improvements in carbureters of the type shown and described in my co-pending application, Serial No. 26,684, filed May 8, 1915.

The objects of my invention are to improve the air valve so that it may operate with the minimum of friction, to balance and position the valve so that shocks and inclined positions of the carbureter will not affect the operation of the air valve, to automatically control the proportion of liquid fuel to air by controlling the amount of auxiliary air admitted for high, low and medium degrees of engine suction, to provide suitable setting devices for adjusting the air valve at high, low and medium degrees of suction so that adjustments may be easily made by inexperienced persons, to provide a conduit so shaped that the mixture of fuel and auxiliary air is thoroughly intermingled before it is admitted to the inlet manifold. This conduit is also water jacketed so that condensation is prevented. I also provide an improved configuration of the walls of the auxiliary air passage so that the air is warmed before commingling with the primary air and fuel. I also provide an improved weather control device for the auxiliary air valve so that the maximum opening may be controlled without in any way affecting the valve spring tension.

In connection with the above mentioned main objects, I have perfected details and improvements in various parts, as will be pointed out hereafter.

In the drawings,

Figure 1 is a side elevation of my improved carbureter, the float chamber being shown in cross section.

Fig. 2 is a section of valve taken on line 2—2 of Fig. 1 and looking in the direction of the arrows.

Fig. 3 is a detail view of the pivot bearing for the air valve spindle.

Fig. 4 is a sectional view of conduit, supplementary air passage and associated parts.

Fig. 5 is a detail view of the air valve showing the position the controlling parts assume for medium and wide open positions.

Fig. 6 is a detail view of the air valve controlling stop.

Fig. 7 is a detail perspective view of the air valve showing the counterbalancing weight thereon.

In the carbureter the float chamber 10 is of the usual form and contains an annular float 11. A supply pipe 12 leads gasolene to a valve 13, which is normally held to its seat thereby closing the supply pipe by a spring 14. When the float 11 falls a pivoted wishbone 15 lifts the valve and allows gasolene to flow into the float chamber until the float again rises. A priming pin 16, which extends upward from the stem of valve 13, is provided for priming the carbureter.

Extending through the float chamber is a primary air tube 17. Extending vertically in this tube is a nozzle 18 which is provided with the usual needle valve 19 having a setting handle at its lower end. Passages are provided to conduct gasolene from the float chamber to the inside of the nozzle. Adjacent the nozzle orifice the primary air tube is restricted by a frusto conical member 21. At the restricted opening at the lower part of this member the primary air and fuel are intermixed. See Fig. 1. Thereafter the mixture passes upwardly past a butterfly throttle valve 22 just before the primary mixture enters the throttle opening supplementary or auxiliary air is added to it. This air is admitted by a valve which will be hereafter described.

The auxiliary air and primary air with intermixed gasolene on their way to the inlet manifold 20 pass through a branched conduit. This branched conduit is shown in Figs. 2 and 4, 23 being one branch and 24 the other. The mixture passes through these conduits as shown by the arrows on Fig. 4. The outer side walls of the conduit are provided with a water jacket 25—26, and the wall 27 which defines the inner edge of the conduits 23—24 is elliptical in shape and extends from the front to the rear walls of the conduits to form a neck. The hollow interior 28 of this neck contains hot water which is admitted from the outer heating jacket 25—26, as shown in Fig. 2. The interior 28 of the neck in reality is an extension of the water jackets 25—26. It is therefore seen that the walls of the branch conduits 23—24 are heated so that condensation is prevented. Pipes 29 and 30 lead the water to and from the water jackets. The gases passing up the conduits 23 and 24 are finally directed together at the upper junction 31. The opposing streams of gases from the two conduits at the junction impact against each other and produce eddy currents which thoroughly mix the gases. These eddys are represented diagrammatically by the arrows in Fig. 4.

*Self contained air warmer.*

The auxiliary air which intermingles with the primary air below the throttle 22 is admitted by a swinging air valve 32, which will be hereafter explained. The passage 33 from the valve chamber 34 to convey the air to a point below the throttle is arcuate and is so disposed that its inner wall is formed by the outer wall 35 of the water jacket 26. In this way the water jacket 26 also serves to heat the incoming auxiliary air. At the same time all of the heating devices are self contained in the carbureter itself and it is unnecessary to apply external heaters to warm the auxiliary air.

*Air valve.*

In my co-pending application, of which this is an improvement, the air valve was mounted on a horizontal pivot. I have found that by making this pivot vertical the valve is less affected by shocks and the tipping of the carbureter does not open and close the valve. I have also found it advisable to offset the pivot so that the effective opening is greater at the beginning of the opening movement of the valve. Various other details have been improved, as will now be pointed out.

The valve 32 is rectangular in form and swings inwardly into the valve chamber 34. The edges 36, 37 and 38 are extended to a point close to the straight sides 39, 40 and 41 of the valve chamber and the side 42 of the valve extends closely to the arcuate wall 43. The valve 32 has integral with its rear face a curved lever or arm 44 which extends to a boss 45 through which extends the spindle 46 which forms a pivot for the valve. The spindle 46 is so located and the arcuate wall 43 is so shaped that upon opening the valve the edge 42 closely follows the arcuate wall 43, as shown in Fig. 5. The effect of so shaping the surfaces 39, 40, 41 and 43 is to admit all of the air between the edge 37 of the valve and the surface 40 of the valve chamber. In order that the effective opening be greater during the early part of the travel of the valve I offset the pivot spindle 45 to one side of a line passing through the seat 47 of the valve.

*Pivot mounting and counterbalance for air valve.*

As previously explained, the boss 45 has extending through it a spindle 46. The arrangement is such that the boss and spindle are secured together and move in unison. The rectangular seat 47 of the valve is independent of the valve chamber and is secured thereto by screws 48. This seat has lateral extensions 49 and 50. These extensions are bored and internally threaded to receive hollow externally threaded studs 51. The interior of these studs is of such dimension that the spindle 46 will fit loosely therein. The lower end of the spindle is pointed at 52, and the stud is capped to form a bearing for the point of the spindle. By adjusting the lower of the studs the valve spindle may be set to any desired vertical position and the flap valve thereby maintained in one set position. This is important as there is a tendency toward leakage when the valve shifts from place to place on the seat. At the same time, due to the point bearing, friction is minimized and dust is kept out of the bearings. The studs 51 have annular knurled heads 53, as shown in Figs. 1 and 3. The exterior unthreaded portion 54 of these studs also forms a bearing for other parts, which will be hereafter described. Extending from the boss 45, and integral therewith, is an arm 55 which carries on its end a weight 56 sufficient to counterbalance the valve 32. By means of this counterbalance and by reason of the vertical mounting of the valve, shocks and tipping of the carbureter in no way effect the air valve.

*Air valve controlling devices.*

Extending from the boss 45, which is integral with the arm 44 carrying the air valve, is a lug or ear 57 which is drilled to receive a pin which pivotally connects the ear 57 with a pair of links 58. These links at their opposite ends are drilled to receive a pin which forms a second pivot connection for a second pair of links 60 which, at their opposite ends, are pivotally connected to the blade spring 62. The relation of the two pairs of links 58 and 60 is such that, as the flap valve 32 is drawn inward under the influence of engine suction, the links 58 and 60 first move inward together in substantially a straight line. It will be understood that the links will move in this manner since the pins forming pivotal con-

nections at their ends and pin 64, joining them, will tend to keep in a straight line. After the air valve has moved to a certain extent, the links 58 contact with part 63 of the boss and thereafter on a further inward movement of the air valve 32, the joint 64 between the links 58 and 60 is broken, as it were, and the links assume an angle toward each other as shown by the dotted line position of these parts in Fig. 5. The angle between the links constantly increases as the air valve 32 moves inwardly. The result of such an action of the parts is that the leverage tending to close the valve is compounded. This gives a constantly and definitely increasing tension to the spring the farther the valve is opened. This proportionate increase of spring tension I have found to be a matter of great importance in the proper operation of the carbureter, for, as suction of the engine increases the wider is the flap valve 32 opened and the more air drawn in; and at the same time the greater is the draft of liquid fuel through the nozzle 18 due to the proportional increased resistance to said air; hence automatically regulating said resistance of the air so that its increase and decrease are directly proportional to the suction due to the pistons. This results in supplying the proper proportion of air and gasolene at every engine speed.

The extensions 49 and 50 of the valve seat extend beyond the pivot spindle bearing and are joined together at 65 and provided with a grooved face 69 shown in Figs. 2 and 5. This groove extends parallel to the face of the valve and is in substantial alinement with the pivot. One arm 66 of a two armed bracket 66, 67 is slidably mounted on the grooved face, the arm being secured in place by a cap screw 68 which is threaded into the arm and which extends through a slot 70 in the grooved face. By loosening this cap screw the bracket may be slid to any desired position. Pivoted to the bracket, as by pivot 71, is a laterally extending and backwardly curved member 72, upon the broad face of which is secured the flat blade or leaf spring 62, the means of attachment of the spring being a bridge piece 73 detachably secured to lugs on the face of 72, as by screws 74. By loosening the latter the flat spring 62 may be slid endwise in either direction. Since the spring is attached to the flap valve through the mediate connections of the links 58 and 60 the position of the latter and the tension or spring resistance upon the flap valve 32 may be adjusted by this forward or backward sliding of the spring 62.

The inner and curving end of the member 72 is adapted to be moved in and out by means of an adjusting member 75, which is screw threaded into the arm 67. By swinging the curved member about its pivot by this adjusting device the initial bowing or initial tension of the spring may be increased or diminished.

The supplemental air or flap valve with the mounting may thus be adjusted in three ways. The flat spring 62 held at its rear end by the bridge 73, as shown, may by slightly raising the latter be moved endwise in either direction. If pulled downward the effect is to lengthen the distance between the point of attachment of the spring upon the links 60 and its point of contact with the curved plate or backing 72 which means a weakening of the effective action of the spring and consequently less resistance to the suction of the engine, hence less suction on the gasolene or liquid fuel. This adjustment is the adjustment for high speed or full opening.

The next adjustment is of the spring and its mounting as a whole toward or away from the part 63 of the boss 45 which effects the point in the movement of the valve at which compounding action in the links 58, 60 begins. By loosening the cap nut 68 the bracket arm 66 may be slid to the left or right to any desired extent. The effect of this change in position of parts is to increase or diminish the distance between links 58 and the part 63 and pivot boss 45, and thus cause the compounding action to begin at a later or earlier period. The result of moving bracket 66 toward the left is to diminish the effective spring tension, whereas when the bracket is moved toward the right the effect is to increase the spring tension. This adjustment is for the middle range of engine speeds.

The third kind of adjustment provided for is the adjustment of the curved member or backing 72 for the flat spring 62. This is the adjustment for slow motor speeds, *i. e.* when the motor is throttled down. By swinging the curved member 72 forwardly by means of the adjusting device 75 the initial tension on the spring 62 may be increased and when this curved member 72 is moved in the opposite direction the initial tension is diminished.

*Cold weather and atmospheric control.*

In the use of carbureters in cold weather I have found that although the carbureter will function properly at low engine speeds if the throttle be quickly opened, the engine will miss fire or stop. This is due to the sudden inrush of cold air through the auxiliary air valve. It has previously been proposed to correct this fault by momentarily increasing the air valve tension. This does correct the above defect to a certain extent, but it affects the setting for low engine speeds, since the spring tension is varied, which is disadvantageous. I have devised a control device which limits the extent of movement of the air valve but does not in any way affect the initial tension. This control device can limit the movement of the air valve to any desired extent or can keep it tightly closed for starting, if desired.

This control device consists of a stirrup shaped yoke 80, which is journaled on the studs 51 on the unthreaded portions 54. The flat bottom portion 81 of the stirrup 80 is adapted to contact with a stop extension 82 on the arm 44 carrying the air valve. The yoke also is provided with a crank arm 83 to which is connected any suitable controlling lever, as 84, Fig. 6. By moving this controlling lever the stirrup or yoke may be set in any desired angular position, and in this way the extreme movement of the flap valve may be limited without changing the spring tension. The yoke also acts as a stop for the extreme movement of the flap valve for normal running, see Fig. 5. Also this yoke 80, if set to extreme forward position, may be used for cutting off all the auxiliary air, thus giving a rich mixture for starting.

I prefer to provide a resilient connection between the crank arm 83 of the control device and the controlling lever 84. A stud 92 is swiveled on the end of arm 83 and this stud is centrally drilled to receive the control lever which passes therethrough and carries at its end a collar 93. Intermediate the collar and the stud is a spring 94. In operating in cold weather the spring 94 yields slightly and thus allows the stirrup 80 to have a slight movement independent of the control lever 94. The effect of this is to admit sufficient air for a very cold motor and thus prevent "choking."

Throttle control devices.

The butterfly throttle valve 22 is mounted on spindle 85, which extends through the side wall of the carbureter and has secured to its end a Y-shaped member 86. A lug 87 coöperates with the arm 88 of the Y member and the other arm carries a screw which limits the closed position of the throttle. To the main arm of the Y member is pivotally connected a control lever 89 which extends to any desired point.

I claim:

1. In an air valve structure for carbureters, comprising, in combination, an auxiliary air inlet of rectangular cross section, a valve chamber having a plurality of straight side walls and an arcuate side wall extending to said rectangular inlet, a swinging flap valve having three sides extending closely to the straight sides of the valve chamber and a fourth side extending closely to the arcuate side wall of said chamber, a pivot for said valve positioned to cause said last mentioned edge to closely follow the arcuate wall on the inward opening of the valve and means in operative association with said flap valve for increasing the resistance to inward opening proportionally to engine suction.

2. In a carbureter, comprising, in combination, an auxiliary air inlet of rectangular cross section, an auxiliary air inlet passage of arcuate form, a valve chamber intermediate said passage and said air inlet having a plurality of straight side walls and an arcuate wall extending to said air inlet, a swinging flap valve having three sides extending closely to said straight side walls and a fourth side extending closely to said arcuate wall, a pivot for said valve, said pivot being positioned to cause one edge of the valve to closely follow the arcuate wall on the inward opening of the valve and means in operative association with the valve for increasing its resistance to inward opening proportionally to engine suction.

3. In a carbureter, in combination, an auxiliary air inlet of rectangular cross section, a valve chamber of rectangular section on three sides, a swinging flap valve of rectangular section having an offset hinge, said valve on the inward movement admitting air between one straight edge of the valve and one of the straight rectangular sides of the valve chamber and means in operative association with the valve for increasing the resistance to inward opening proportionally to the increase in engine suction.

4. In a carbureter, comprising, in combination, an auxiliary air inlet of rectangular cross section, a swinging flap valve of rectangular section and having an offset hinge to cause rapid effective opening of the valve in the initial travel and means in operative association with the valve for increasing the resistance to inward opening proportionally to the increase in engine suction, said means comprising a blade spring and means for progressively varying the action of the blade spring on the valve.

5. In a carbureter, comprising, in combination, an inwardly swinging flap valve, a vertical pivot for said valve, means for holding said valve to its seat comprising a resilient member and a plurality of links connecting said member and said valve, said links being adapted on the inward movement of the valve to contact with the pivot and thereafter compound the leverage between the valve and the resilient member.

6. In a carbureter, in combination, an inwardly opening flap valve, a seat therefor, a spring for holding said valve in normally closed position, means for variably increasing the tension of the spring upon the valve upon an increase of engine suction, said means comprising a plurality of links and means for compounding the action of said links at a certain point in the travel of the valve.

7. In a carbureter, in combination, an inwardly swinging flap valve, a seat therefor, a spring for holding said valve to its seat, means for variably increasing the tension of the spring upon the valve upon an increase of engine suction, said means comprising a plurality of links adapted to compound at a certain point in their travel, and means for varying said point of compounding at will.

8. In a carbureter, in combination, an inwardly opening flap valve, a pivot for said valve, a spring, a plurality of swinging connections between said spring and said valve, means associated with the pivot for abutting against one of the aforesaid connections, and thereby to compound the action of said connections whereby greater spring tension is progressively applied as the valve opens inwardly.

9. In a carbureter, in combination, an inwardly swinging flap valve, a vertical pivot therefor, said pivot comprising a spindle having a pointed end and means for supporting said spindle and adjusting its vertical position, whereby the valve may be set to any desired vertical position.

10. In a carbureter, in combination, an inwardly swinging flap valve, a vertical pivot about which said valve is adapted to swing, and a counterbalance for said valve located upon the opposite side of said pivot from said valve, said counterbalance and said vertical pivot preventing vertical shocks or inclinations affecting the said valve.

11. In a carbureter, in combination, an inwardly swinging flap valve, means for pivoting said valve on a vertical axis comprising a spindle attached to the valve, means for supporting the lower end of the spindle and means for maintaining the spindle in vertical alinement.

12. In a carbureter, in combination, an inwardly swinging flap valve, means in operative association with said valve for increasing the resistance to inward opening proportionally to engine suction, and means for limiting the extreme movement of the valve without affecting the initial tension on the valve, and means for variably setting the said extreme limiting means.

13. In a carbureter, in combination, an inwardly swinging flap valve, means in operative association therewith for increasing its resistance to inward opening proportionally to engine suction, a yoke pivoted on the pivot of the flap and means for setting said yoke in varying angular positions to limit the extreme movement of said flap valve.

14. In a carbureter, in combination, an inwardly swinging flap valve, an arm connecting said valve with its pivot, an abutment on said arm, a resilient means coöperating with said arm for holding the flap valve to its seat, a yoke member pivoted on the flap valve pivoted and having a portion adapted to coöperate with the abutment on the aforesaid valve arm to limit the angular movement of said flap valve and means for setting the said yoke member in varying angular positions.

15. An air valve structure for carbureters, comprising a rectangular swinging flap valve, means in operative association with said flap valve for increasing its resistance to inward opening proportionately to the increase in engine suction, adjusting means for varying the resistance to the opening of the valve, said means being adapted to adjust the resistance without affecting the initial tension on the valve, and means for adjusting the initial tension on the said swinging valve.

16. An air valve structure for carbureters, comprising, in combination, a swinging air valve, a blade spring for holding said valve to its seat and resisting the inward movement of said valve under the influence of engine suction, a plurality of adjusting means for said spring, one device adjusting the spring for excessive engine suction, a second device adjusting the said spring for medium degrees of engine suction, and a third device adjusting the spring for low engine suction.

17. An air valve structure for carbureters, comprising, in combination, a swinging air valve of rectangular cross section, a spring for holding said valve to its seat and resisting the movement of said valve under the influence of engine suction, means for varying the tension on said spring under low, medium and high engine suction, said means being independent one of the other, whereby any desired adjustment may be made for a particular engine suction without affecting the adjustment at other degrees of engine suction.

18. In a valve structure for carbureters, the combination of a flap valve, a swinging connection attached to the outer end thereof, a spring attached to said swinging connection, and means for adjusting the effective length of said spring.

19. In a valve structure for carbureters, the combination of a flap valve, a flat spring operatively associated therewith to maintain the same in normally closed position, a curved plate upon which said spring is mounted and means for adjusting the extent of contact between said spring and said plate.

20. In a valve structure for carbureters, the combination of a flap-valve, a flat spring operatively associated therewith, a curved plate upon which said spring is mounted, means for holding the curved plate in definite relation to the plane of the flap-valve, and means for varying said angular relation.

21. In a valve structure for carbureters, the combination of a flap-valve, a member pivotally connected to the outer face of said valve, a spring operatively associated with said member, a mounting for said spring, and means for varying the distance between said mounting and the point of attachment of said member.

22. An air valve structure for carbureters, comprising in combination, a rectangular flap valve for admitting auxiliary air, resilient means for holding said valve in closed position, a plurality of independent adjusting devices for said resilient means, one device being adapted to control the movement of the valve under low engine suction, a second of said devices being adapted to control the movement of said valve under medium engine suction and a third of said devices being adapted to control the movement of the valve under high engine suction.

23. An air valve for carbureters comprising in combination, an inwardly opening flap valve, a seat therefor, a spring for retaining said flap valve in normally closed position and means for variably increasing the tension on the flap valve in direct proportion to the increase in engine suction, said means comprising a plurality of links adapted to compound the action of the spring on the valve at a definite point in the inward movement of the valve.

24. In a valve structure for carbureters, the combination of a flap valve pivotally mounted to swing inwardly, a link pivotally mounted upon an extension on the outer face of said valve, a member adapted as the valve is opened to impinge against the outer end of the link and depress the same, and means for adjusting the distance between the outer end of said link and said member when the valve is in closed position.

25. In a valve structure for carbureters, the combination of a flap valve, a swinging connection attached to the outer end thereof, a spring attached to said swinging connection, means for adjusting the effective length of the spring, and means for varying the initial tension on spring.

In testimony whereof I affix my signature hereunto.

GEORGE H. TABER.